(12) United States Patent
Jahnz

(10) Patent No.: US 7,789,369 B2
(45) Date of Patent: Sep. 7, 2010

(54) METHOD OF USE FOR EASY SET-UP POLE AND SUPPORT SYSTEM

(76) Inventor: David Brian Jahnz, 5695 Menorca Dr., San Diego, CA (US) 92124

(*) Notice: Subject to any disclaimer, the term of this patent is extended or adjusted under 35 U.S.C. 154(b) by 34 days.

(21) Appl. No.: 12/019,192

(22) Filed: Jan. 24, 2008

(65) Prior Publication Data

US 2008/0116349 A1    May 22, 2008

Related U.S. Application Data

(62) Division of application No. 10/977,686, filed on Feb. 15, 2005, now Pat. No. 7,618,015.

(51) Int. Cl.
*A01K 97/10* (2006.01)
(52) U.S. Cl. .................. 248/540; 403/344; 211/60.1; 224/571
(58) Field of Classification Search ........ 248/511, 248/518, 521, 523, 534, 535, 514, 515, 524, 248/525, 527, 540, 541; 403/344, 353; 211/60.1, 211/196, 205, 107; 224/571, 567, 546, 533, 224/537
See application file for complete search history.

(56) References Cited

U.S. PATENT DOCUMENTS

| 110,434 | A | * | 12/1870 | Clarke | 248/515 |
|---|---|---|---|---|---|
| 136,417 | A | * | 3/1873 | Coe et al. | 280/172 |
| 649,367 | A | * | 5/1900 | Seiler | 248/538 |
| 1,808,328 | A | * | 6/1931 | Thomson | 248/74.1 |
| 2,988,310 | A | * | 6/1961 | Wright | 248/511 |
| 3,134,978 | A | * | 5/1964 | Arvay, Jr. | 343/709 |
| 3,178,538 | A | * | 4/1965 | Kradel et al. | 337/209 |
| 3,208,703 | A | * | 9/1965 | Arnold et. al. | 248/514 |
| 3,357,663 | A | * | 12/1967 | Ivy | 248/539 |
| 3,436,108 | A | * | 4/1969 | Van Buren, Jr. | 52/489.1 |
| 3,744,688 | A | * | 7/1973 | Kezer | 224/442 |
| 3,943,524 | A | * | 3/1976 | Sample | 343/888 |
| 3,995,742 | A | * | 12/1976 | Austin et al. | 211/70.8 |
| 4,057,180 | A | * | 11/1977 | Whittaker | 224/282 |
| 4,109,796 | A | * | 8/1978 | Mitchell | 211/70.8 |
| 4,313,104 | A | * | 1/1982 | Phillips | 340/436 |
| 4,655,492 | A | * | 4/1987 | Landry | 294/15 |
| 4,687,168 | A | * | 8/1987 | Rupp | 248/539 |
| 4,789,200 | A | * | 12/1988 | Munguia | 297/184.16 |
| 5,040,763 | A | * | 8/1991 | Wilson | 248/539 |
| 5,557,876 | A | * | 9/1996 | Parker | 43/21.2 |
| 5,564,610 | A | * | 10/1996 | Barron | 224/268 |
| 5,806,903 | A | * | 9/1998 | George | 294/19.1 |
| 6,269,990 | B1 | * | 8/2001 | Gray | 224/200 |
| 6,634,823 | B2 | * | 10/2003 | Sciortino | 403/13 |
| 6,768,474 | B2 | * | 7/2004 | Hunt | 343/892 |
| 6,802,150 | B2 | * | 10/2004 | Harden | 43/21.2 |
| 6,889,878 | B2 | * | 5/2005 | Parsons | 224/200 |
| 7,040,592 | B1 | * | 5/2006 | Thomas | 248/511 |
| 7,070,218 | B2 | * | 7/2006 | Bercaw et al. | 294/15 |
| 2003/0051388 | A1 | * | 3/2003 | Barnes et al. | 43/21.2 |

* cited by examiner

*Primary Examiner*—Kimberly T Wood
(74) *Attorney, Agent, or Firm*—John K. Buche; Buche & Associates, P.C.

(57) ABSTRACT

A method for installing a means capable of removably securing a pole, comprising installing a first support, installing a second support, inserting said pole into said first support, and thereafter, inserting said pole into said second support.

3 Claims, 18 Drawing Sheets

METHOD OF USE FOR EASY SET-UP POLE AND SUPPORT SYSTEM

CROSS-REFERENCE TO RELATED APPLICATIONS

The application is entitled to the benefit of the filing date of the prior-filed provisional application No. 60/513,337, filed on Oct. 23, 2003. The present application is a divisional application of application Ser. No. 10/977,686, filed on Feb. 15, 2005.

STATEMENT REGARDING FEDERALLY SPONSORED RESEARCH OR DEVELOPMENT

Not applicable.

FIELD OF THE APPLICATION

The application relates generally to a system for the erection of, securing of, and removal of a pole such as flagpole.

BACKGROUND

Erecting a sturdy removable pole, such as a flagpole, can be cumbersome, expensive or even dangerous in some situations. First, removable poles can be unstable and a ladder or the like may be required for assembly purposes depending on the intended elevation of the pole. A permanently mounted pole is an option, but in situations where the pole must be frequently removed a permanently mounted pole is not practical. Second, removable poles must either be secured at two locations, i.e., the ends of the pole and/or middle span, or in the alternative, the removable pole must be sturdy enough to stand from a single point connection of some type. A sturdy single point connection type pole is heavy, costly and time consuming to put up and take down. The pole supported at two locations usually requires that the pole be clamped and unclamped every time it is assembled.

Hence from the foregoing, it will be appreciated that there is a need to be able to erect and remove a pole, such as a flagpole, without using a ladder and the like, and without using clamps and the like.

SUMMARY

The present application relates to an assembly for securing a pole comprising a first support for receiving a portion of the pole, the first support comprising a tubular member and a mounting means for securing said first support to a surface; and a second support for receiving a different portion of the pole, said second support comprising a tubular member and a mounting means for securing said second support to a surface, said second support being aligned longitudinally with the first support; wherein the tubular member of the first support comprises an open angled slot comprising a width greater than the outer diameter of the pole; and to methods for employing the assembly.

BRIEF DESCRIPTION

Figure 1:
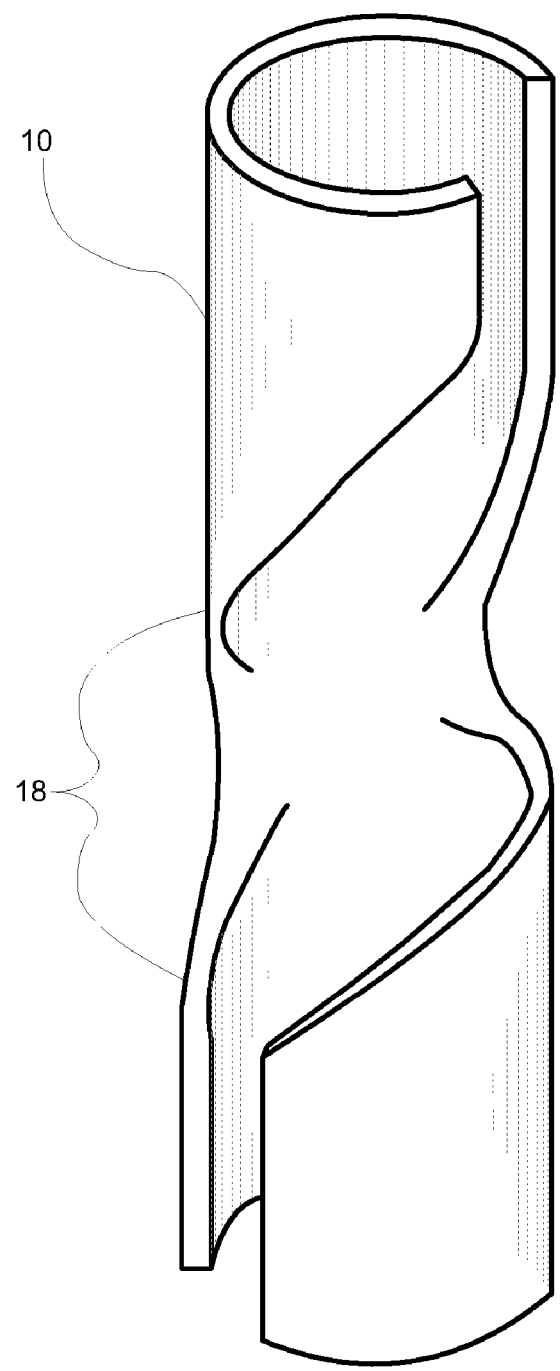
FIG. 1 illustrates a perspective view of a twist member.
Figure 2:
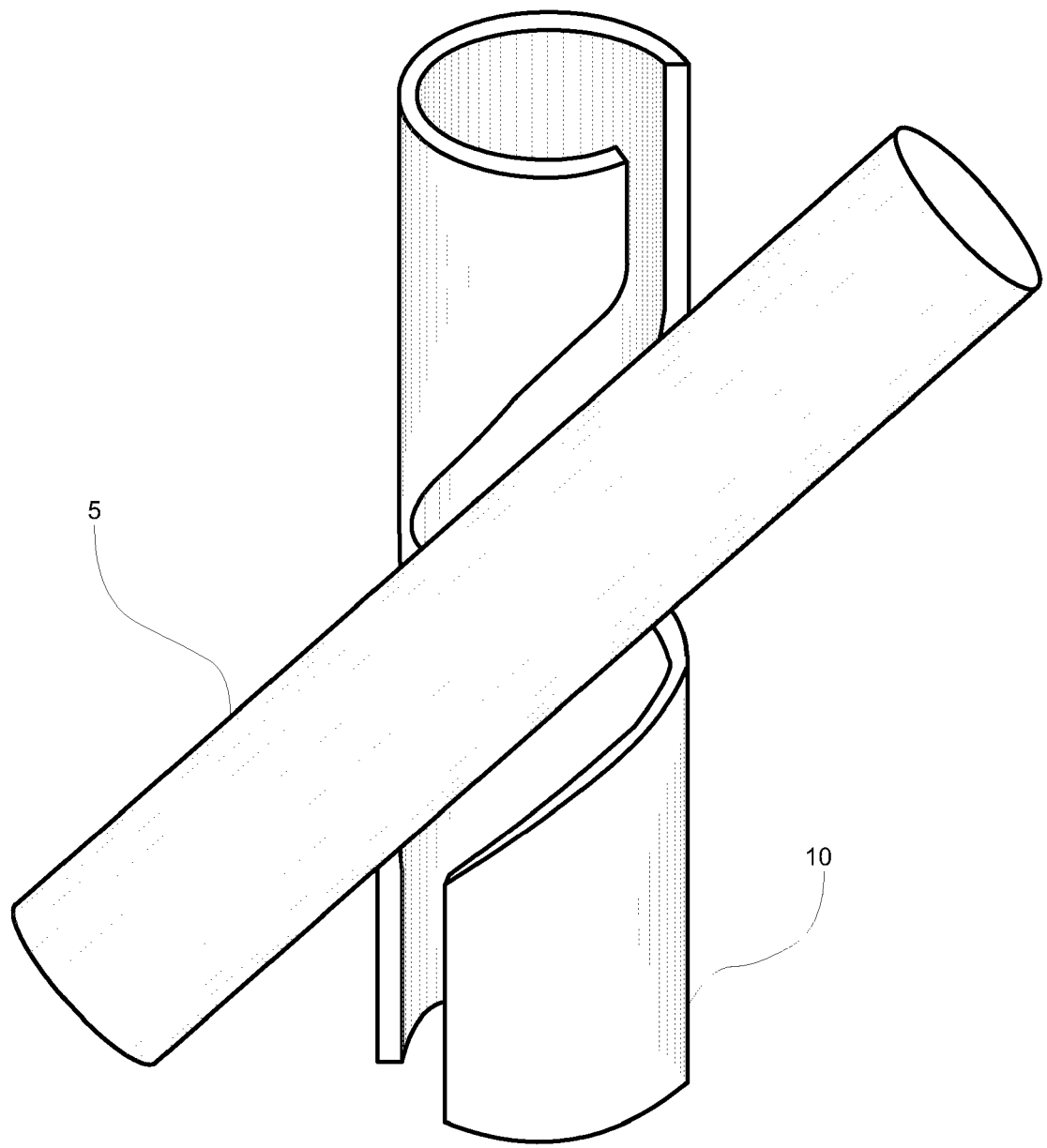
FIG. 2 illustrates a flagpole inserted in a twist member at a 35° angle.
Figure 3:
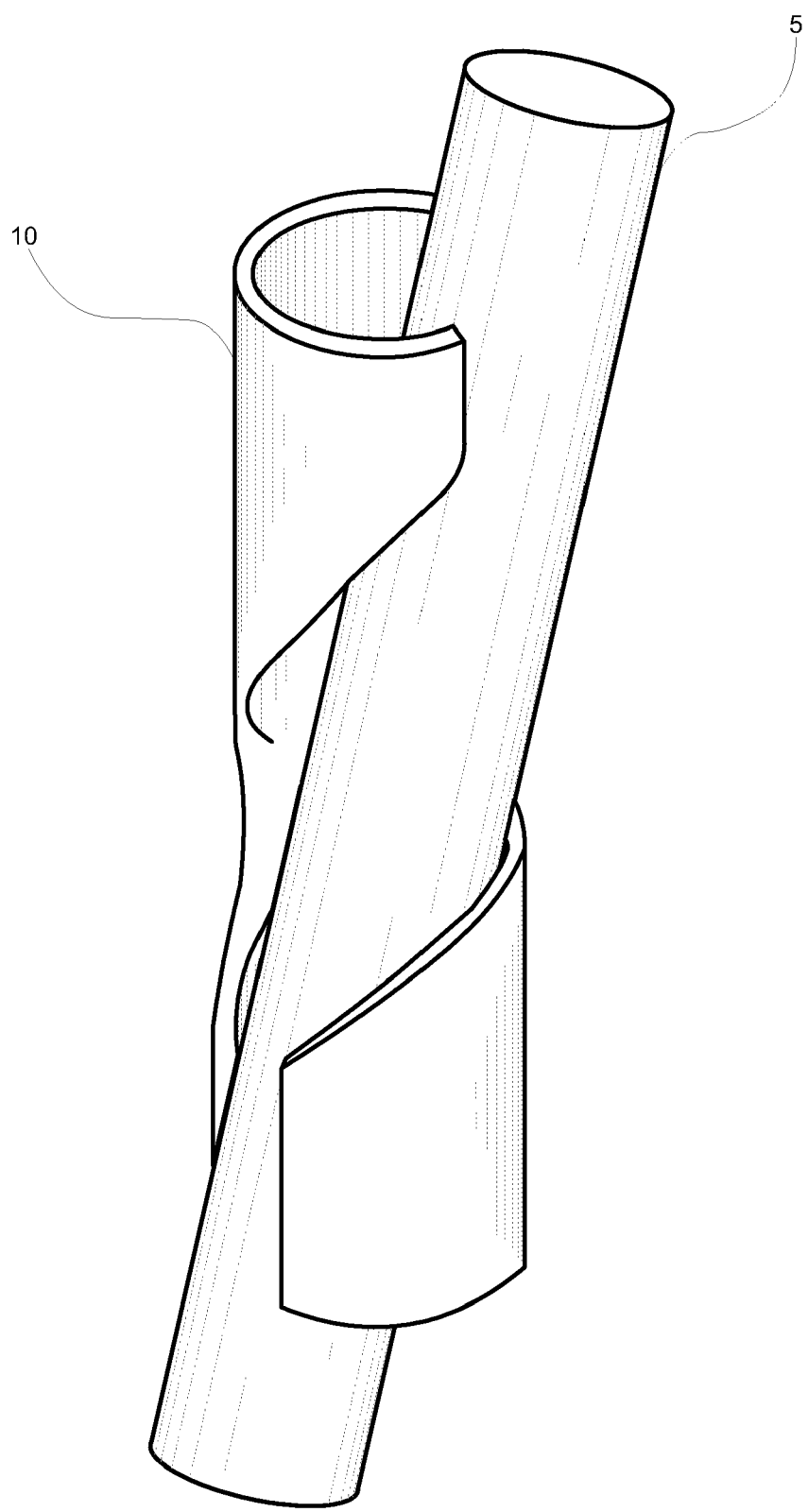
FIG. 3 illustrates a flagpole inserted in a twist member at a 75° angle.
Figure 4:
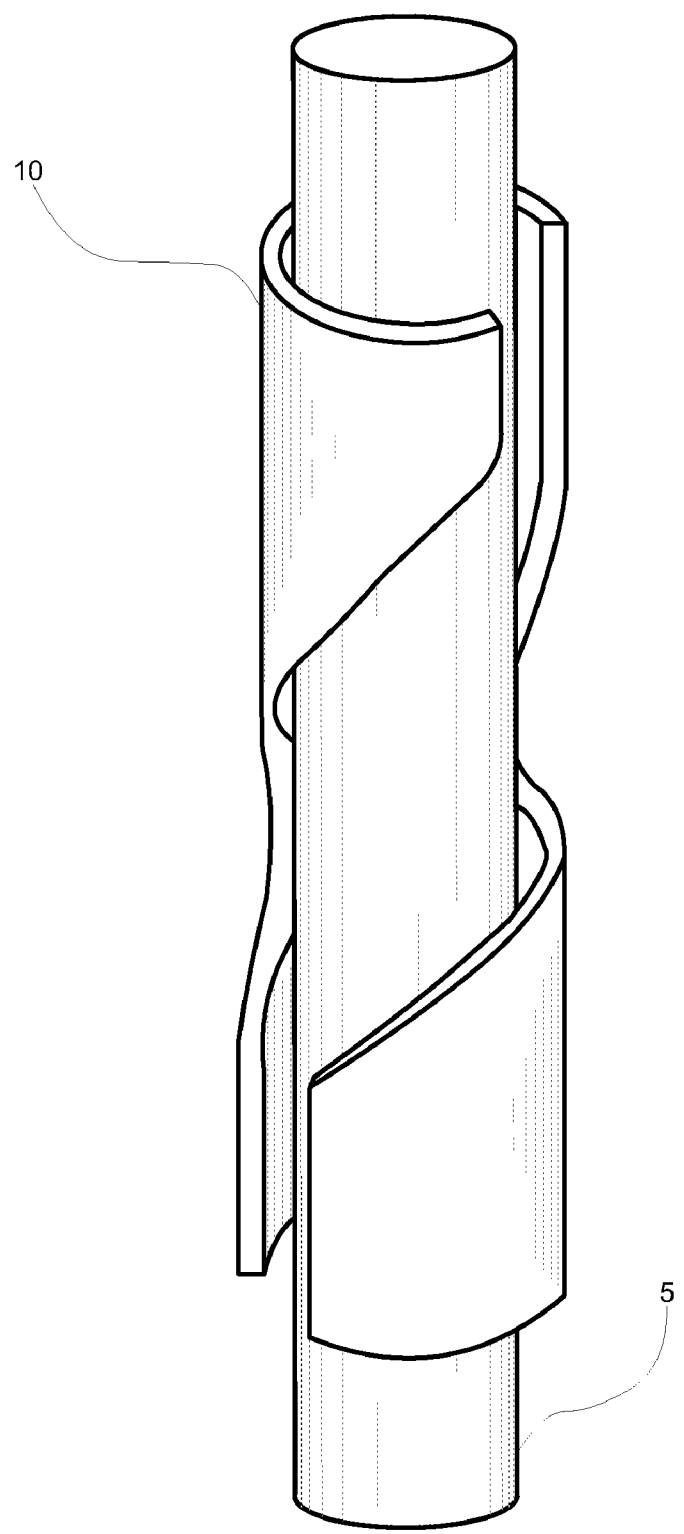
FIG. 4 illustrates a flagpole inserted longitudinally in a twist member.
Figure 5A:
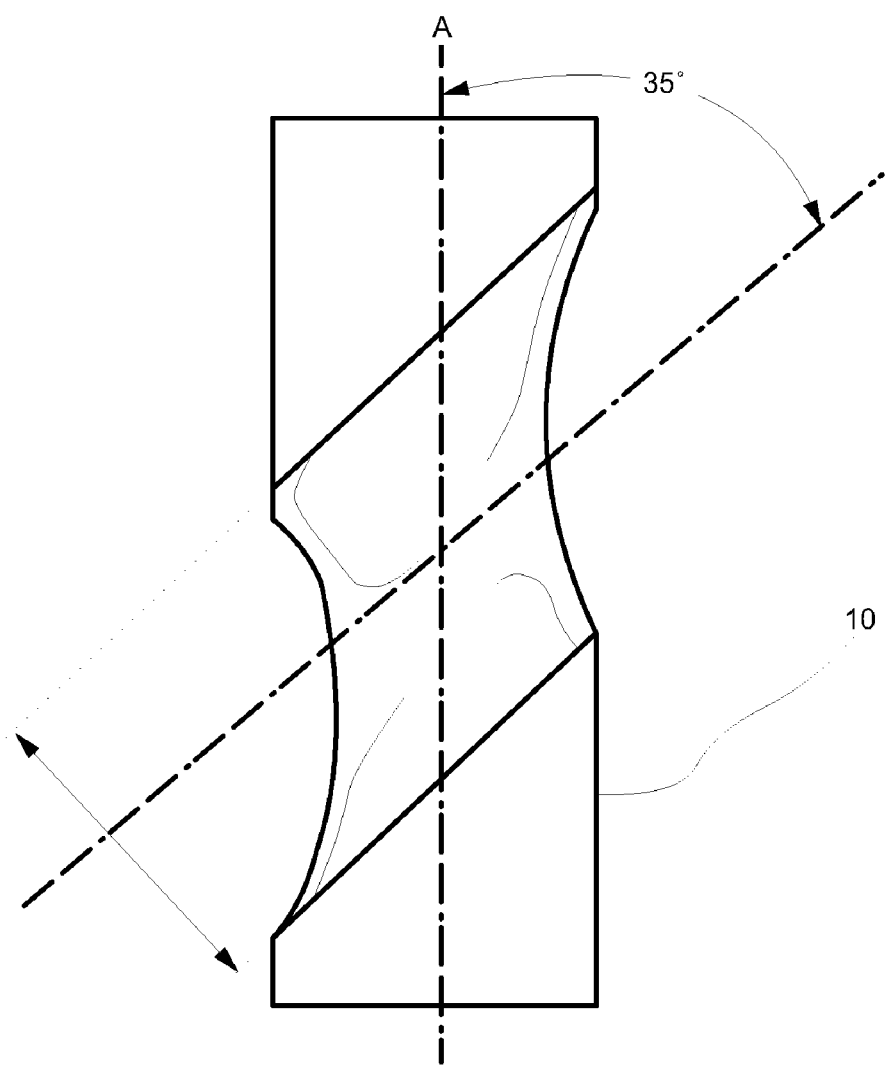
FIG. 5a illustrates a side view of a twist member.
Figure 5B:
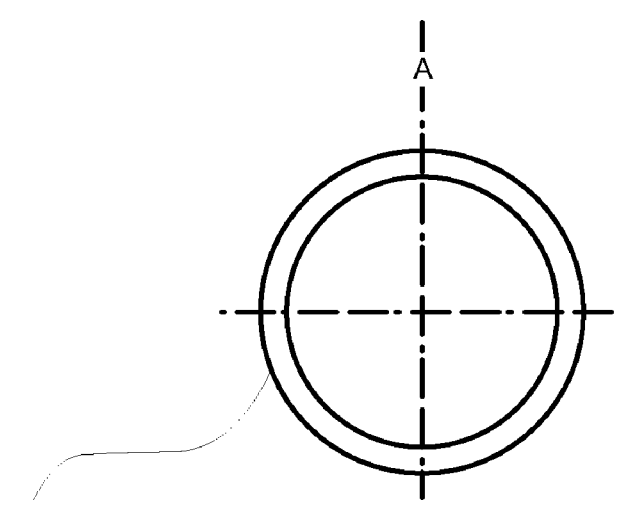
FIG. 5b illustrates a top view of a twist member.

It has been found that an assembly comprising a first support and a second support can be configured to receive and secure a pole, such as a flagpole, in a non-horizontal position at a predetermined height without the necessity of a fastener to secure the pole and without the necessity of a ladder or the like to install the pole. Heretofore, such a desirable achievement has not been considered possible, and accordingly, the apparatus, system and method of this application measure up to the dignity of patentability and therefore represents a patentable concept.

In one aspect, the present application provides an assembly for receiving and securing a flagpole at an elevation equal to or greater than the height of a user.

In another aspect, the present application provides a method employing an assembly for removing a flagpole from a secured position at an elevation equal to or greater than the height of a user.

In another aspect, the present application provides an assembly for securing a pole in a vertical orientation without the necessity of clamps or other fastening means.

In another aspect, the present application provides an assembly for securing a pole in a vertical orientation, the assembly comprising at least two parts in vertical alignment wherein the uppermost part of the assembly is operationally configured to (1) receive the pole, and (2) direct the pole underneath the upper most part toward the lower most part of the assembly to align with the lower most part.

In another aspect, the present application provides a method of installing a pole to a secured position and removing a flagpole from a secured position by maneuvering the flagpole through a vertically aligned assembly secured at an elevation higher than the user installing the pole.

The various characteristics described above, as well as other features, will now be described with reference to the accompanying drawings, wherein like reference numerals are used for like features throughout the several views. It is to be fully recognized that the different teachings of the embodiments disclosed herein may be employed separately or in any suitable combination to produce desired results.

Figure 7:
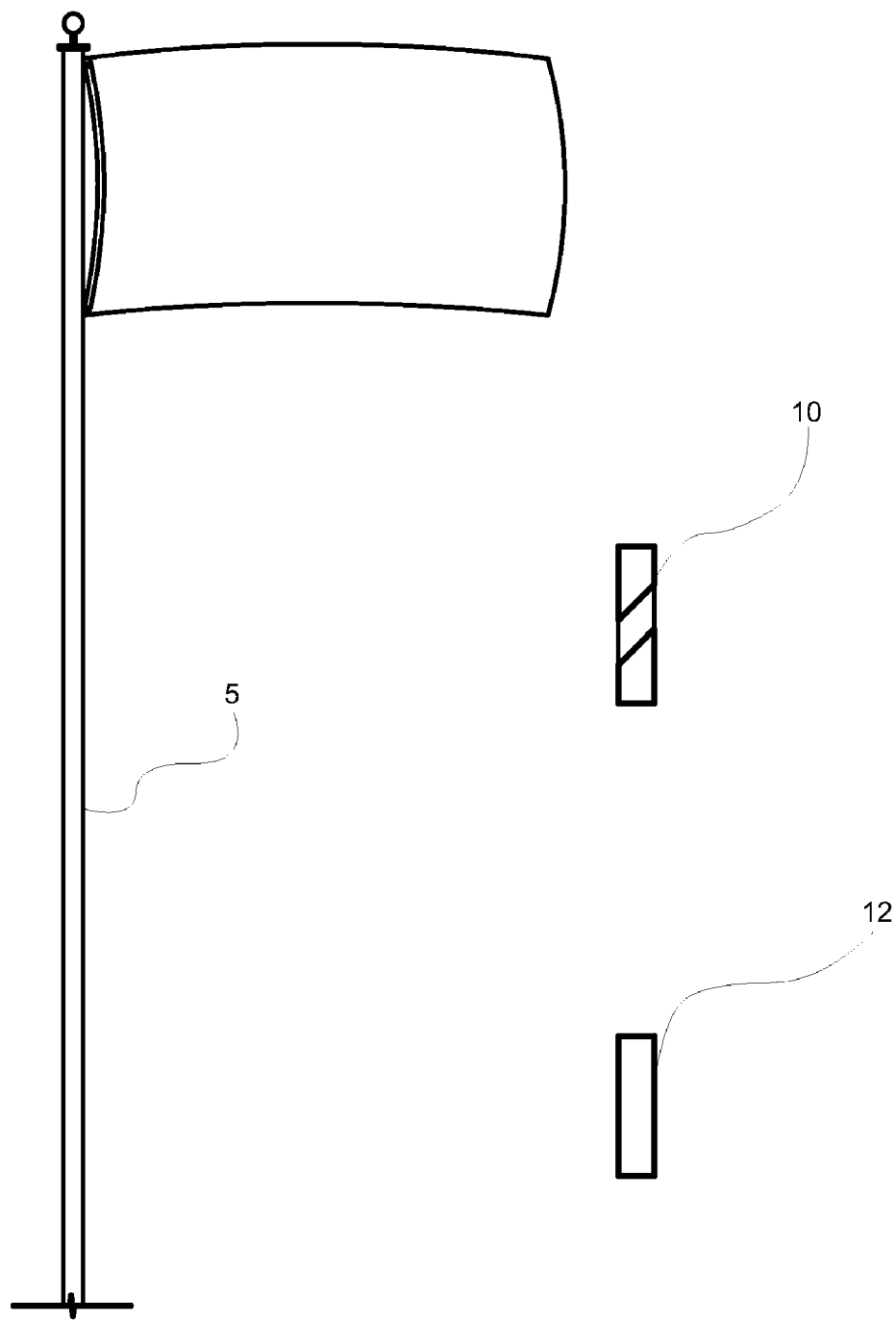
FIG. 7 illustrates a view of a flagpole and a twist member/socket member assembly in vertical alignment.

A simplified embodiment of the assembly of this application is depicted in FIG. 7. Suitably, the assembly comprises at least an upper twist member 10 and a lower socket member 12. The twist member 10 and the socket member 12 are suitably secured at a predetermined elevation wherein the central axis of members 10 and 12 are aligned in order to hold and secure a substantially straight pole 5.

With reference now to FIG. 1, a twist member 10 of the first support is provided. Suitably, the twist member 10 is a tubular type object having an outer wall and an inner wall with open ends and an open angled slot 18. As shown, the ends of the twist member 10 are generally C-shaped so that the wall of the twist member 10 comprises a non-straight opening along its length through the open angled slot 18. In one embodiment, the open angled slot 18 is formed near the center of the twist member 10 at an angle of about 35° in relation to the central axis A-A of the twist member 10. In a particularly advantageous embodiment, a pole can be passed through the sidewalls of the twist member 10 through the open angled slot 18.

As depicted in the figures, the length of the twist member 10 is greater than the diameter of the pole 5 being installed there through. In addition, the inner diameter of the twist member 10 is greater than the outer diameter of the pole 5 to be inserted there through. Suitably, the inner diameter of the twist member 10 is up to about ⅛ greater than the outer diameter of the pole 5 to be inserted there through. In addition, the open angled slot 18 comprises a width greater than the outer diameter of the pole being installed through the twist member 10. Although not necessarily limited to a particular width, the open angled slot 18 suitably comprises a width up to about ⅛ greater than the width of a corresponding pole 5. Although the twist member 10 may be built to scale, a typical twist member 10 for use with commercially available flagpoles comprises a length of about 15.24 cm (about 6.0 inches). Likewise, the wall thickness of the twist member 10 is dependant on the material(s) from which the twist member is constructed.

Figure 6:
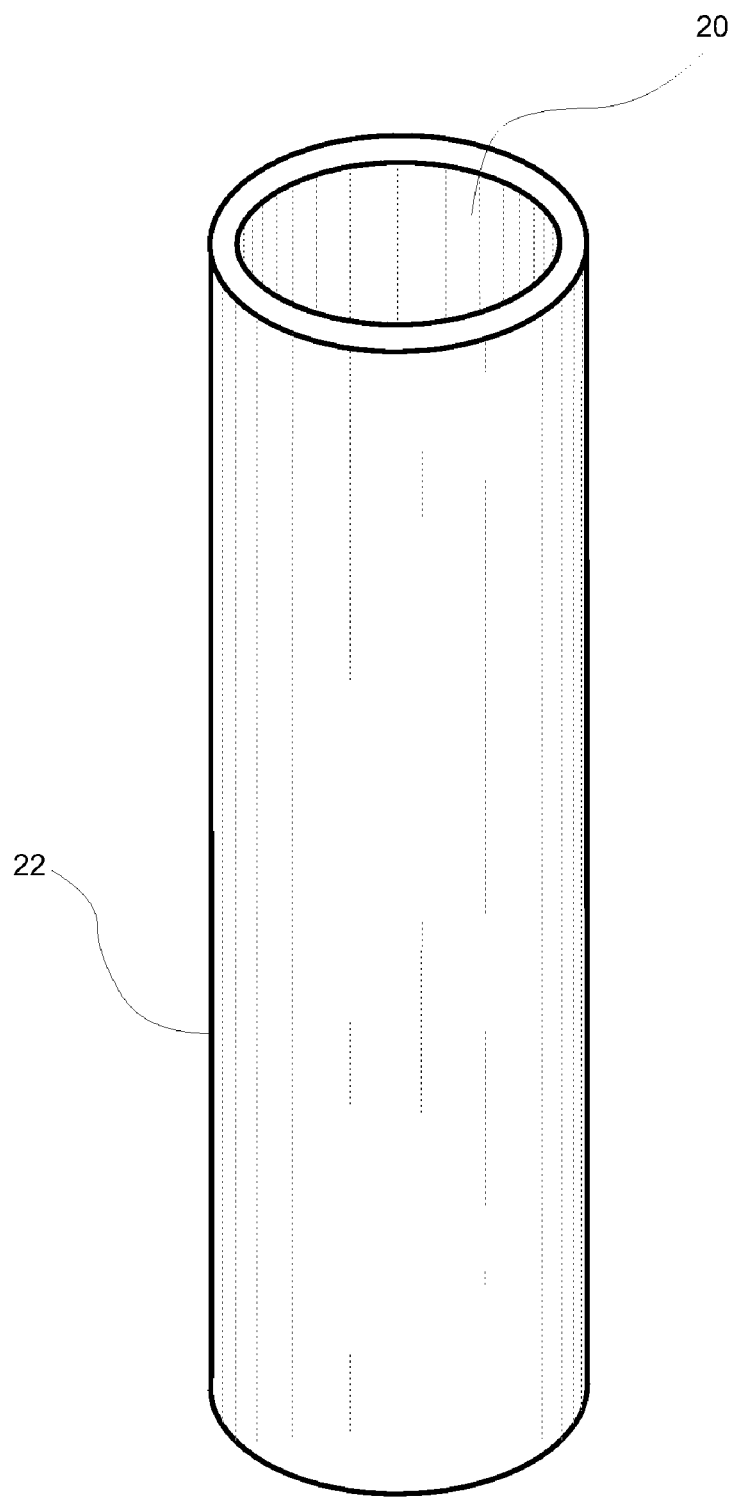
FIG. 6 illustrates a perspective view of a socket member.

With reference now to FIG. 6, a simplified socket member 12 of the second support is provided. Suitably, the socket member 12 is a tubular type object having a first open end 20 and a second closed end 22, the closed end 22 being operationally configured to hold the pole 5. In addition, the inner diameter of the socket member 12 is greater than the outer diameter of the pole 5 to be inserted into the socket member 12. In a suitable embodiment, the inner diameter of the socket member 12 is up to about ⅛ greater than the outer diameter of the pole 5 to be inserted into the socket member 12. Although the socket member 12 may be built to scale, a typical socket member 12 for use with commercially available flagpoles comprises a length of about 15.24 cm (about 6.0 inches). Likewise, the wall thickness of the socket member 12 is dependant on the material(s) from which the twist member is constructed.

Suitably, the twist member 10 and the socket member 12 are constructed from one or more materials effective to secure a pole in a desired position. Likewise, the twist member 10 and the socket member 12 are constructed from one or more materials including but not necessarily limited to those materials resistant to chipping, cracking, excessive bending and reshaping as a result of ozone, weathering, heat, moisture, and other outside mechanical and chemical influences. Suitable materials, include, for example a metal such as aluminum and a thermoplastic such as acrylonitrile butadiene styrene ("ABS").

Figure 8:
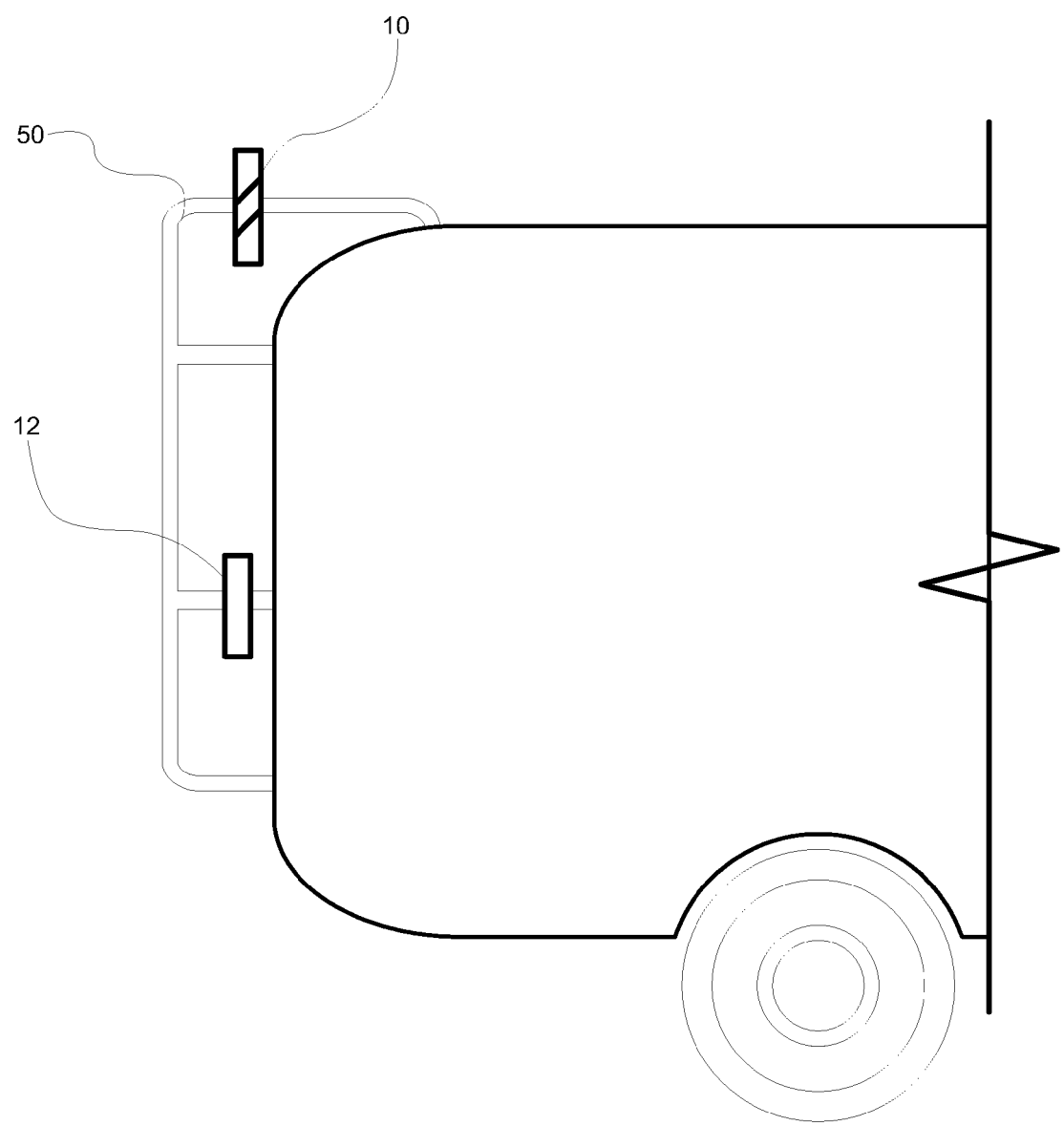
FIG. 8 illustrates a view of a twist member/socket member assembly secured in vertical alignment to a motor home.

Suitably, the assembly can be mounted to numerous surfaces. In one embodiment, the assembly is mounted at a predetermined height on a surface whereby the twist member 10 is set at a point above and inline with the socket member 12. As shown in FIGS. 7 and 8, the central axis of the twist member 10 is aligned with the central axis of the socket member 12 so to receive a substantially straight pole 5. A suitable surface as referenced herein includes an RV, more particularly, an RV ladder.

An assembly attached to the ladder of an RV can be seen in FIG. 8. As shown, the twist member 10 is secured to the upper part of the RV ladder with the socket member 12 attached at a point on the RV ladder below and in vertical alignment with the twist member 10. It is herein contemplated that the first support and second support further comprise a mounting means for securing the twist member 10 and socket member 12 to various types of surfaces as required by a particular surface configuration. In an embodiment including securing the assembly to an RV ladder, a suitable mounting means for mounting the twist member 10 and socket member 12 includes a multi-positional mount bracket and channel clamp assembly. Other embodiments may include using hose clamps or equivalent attachment means known to those of ordinary skill in the art.

Figure 14:
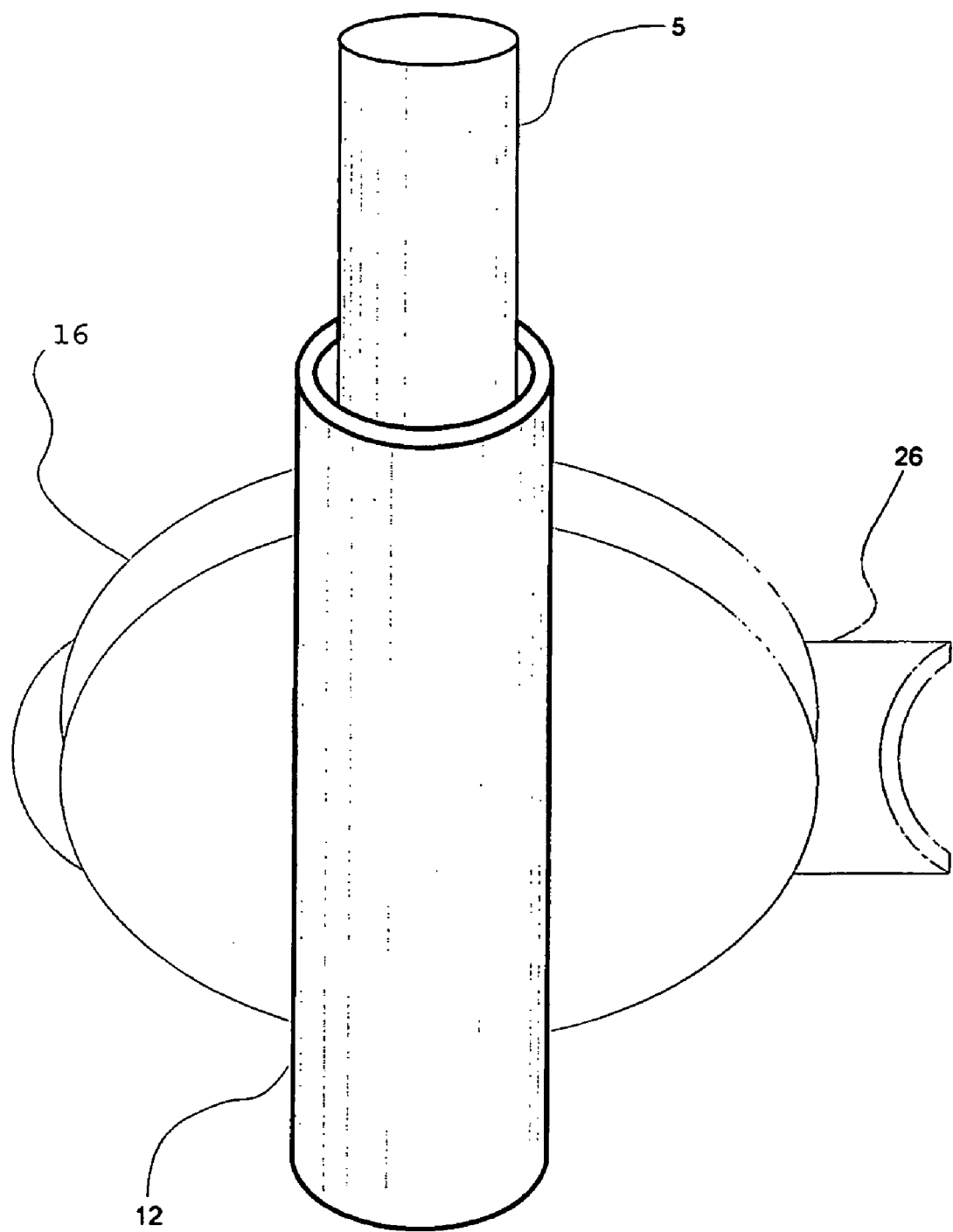
FIG. 14 illustrates a front perspective view of a mounting means including a channel clamp, multi-positional mounting bracket attached thereto, and a socket member attached to the mounting bracket.
Figure 15:
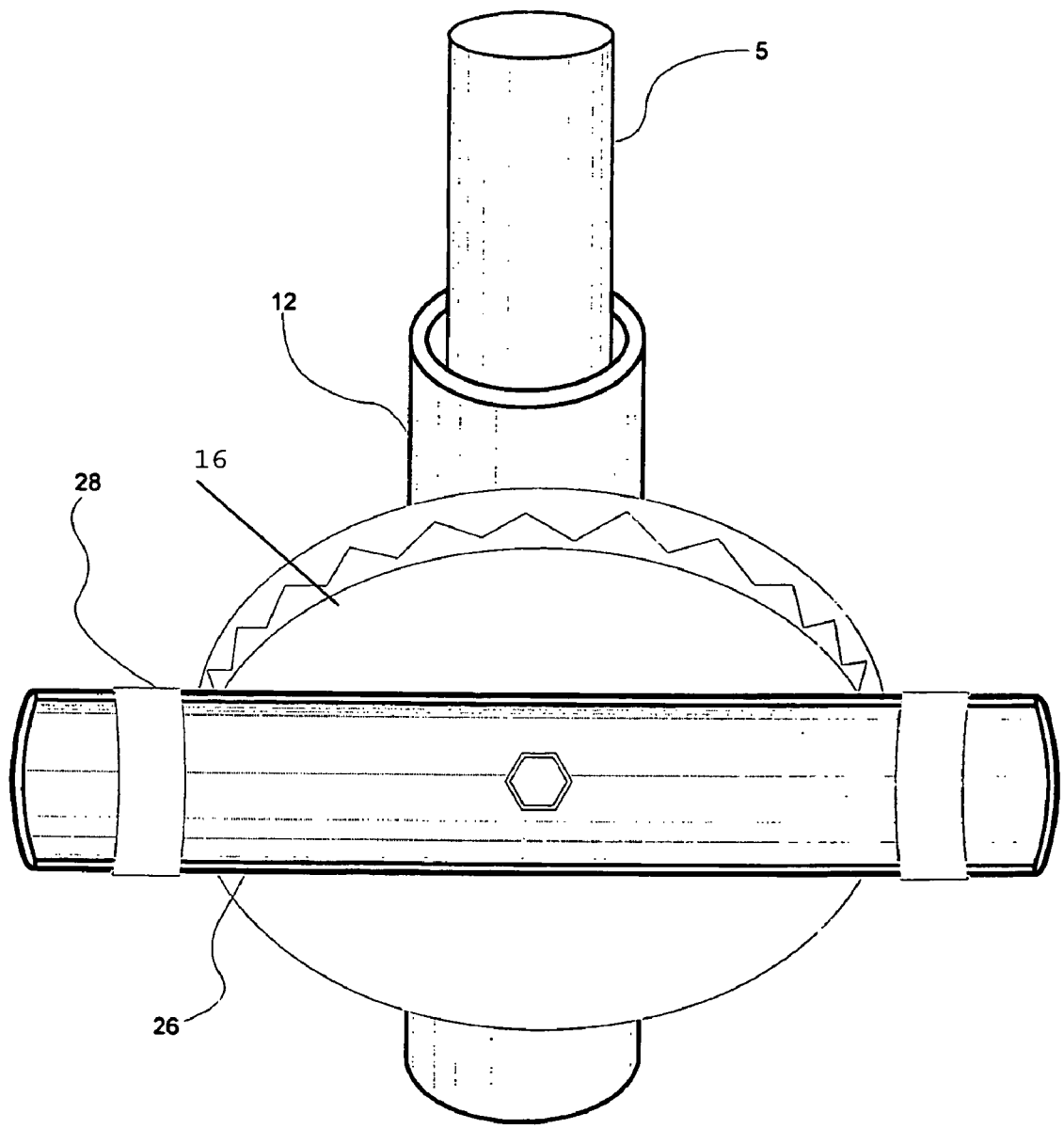
FIG. 15 illustrates a rear perspective view of a mounting means including a channel clamp, multi-positional mounting bracket attached thereto, and a socket member attached to the mounting bracket.

A simplified illustration of a mounting means including a multi-positional mount bracket and channel clamp assembly for mounting a socket member 12 to an RV ladder is provided in FIG. 14. As shown, the socket member 12 is attached to a first side of a multi-positional mount bracket 16, while a channel clamp 26 is attached to the opposite side of the multi-positional mount bracket 16. Suitably, the channel clamp 26 is operationally configured to fasten to a rung or similar part of an RV ladder. In one embodiment, the channel clamp 26 includes a "C" clamp operationally configured to snap onto a rung or similar part of an RV ladder. In another embodiment, the channel clamp 26 includes a "C" clamp further having straps 28 for securing the clamp 26 to a rung or similar part of an RV ladder 50—as shown in FIG. 15.

Figure 16:
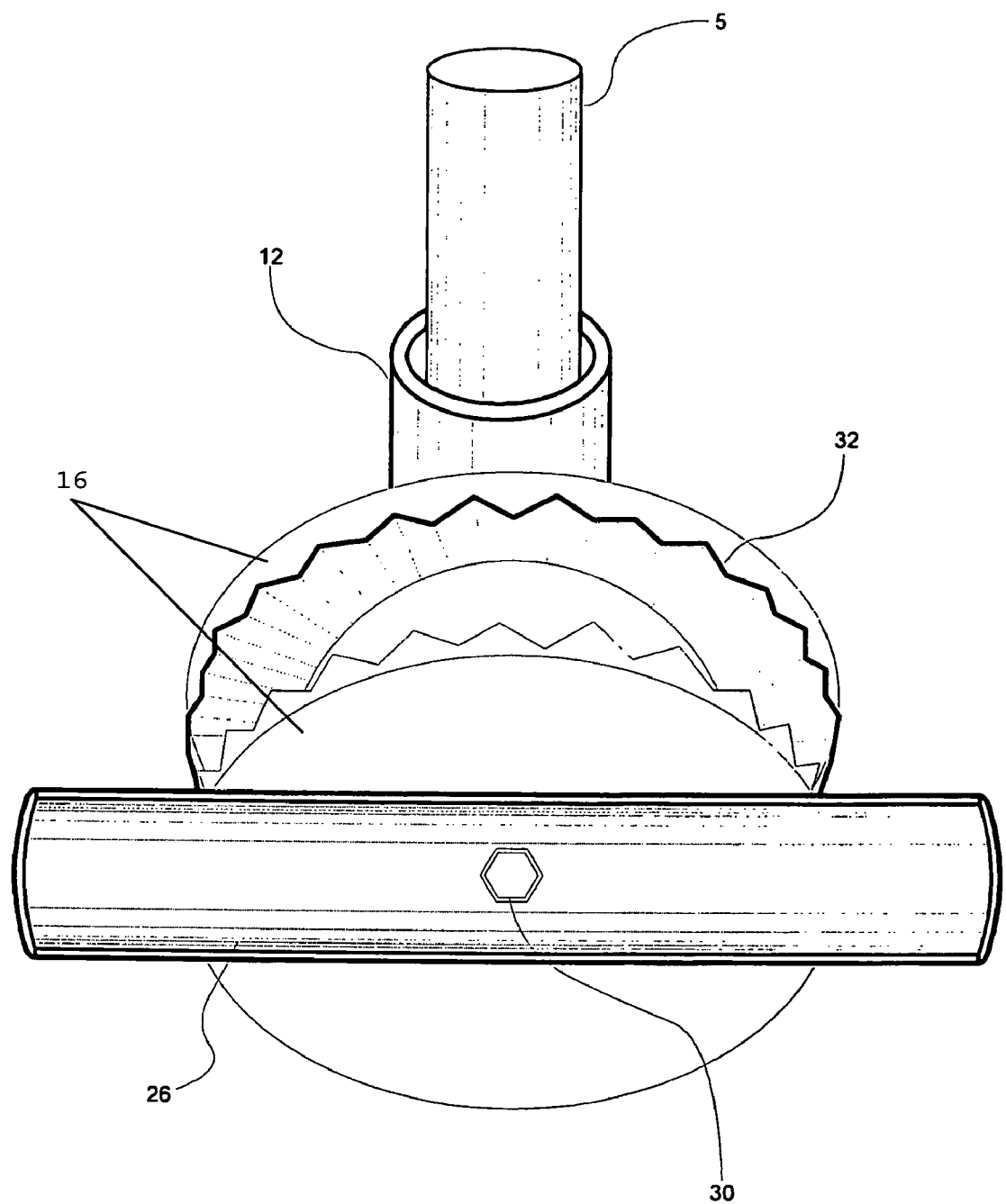
FIG. 16 illustrates a partially exploded rear perspective view of a mounting means including positional teeth of a multi-positional mounting bracket.

The channel clamp 26 may be fixed to the multi-positional mount bracket 16, or in the alternative the channel clamp 26 may be releasably attached to the multi-positional mount bracket 16. As shown in FIG. 16, the channel clamp 26 may be releasably attached to the multi-positional mount bracket 16 using a locking bolt 30. Although not necessarily limited to a particular material or materials, suitable multi-positional mount brackets 16 and channel clamps 26 are constructed from known mount bracket and clamp materials. The multi-positional mount brackets 16 may also be disassembled as shown in the figures.

Figure 17:
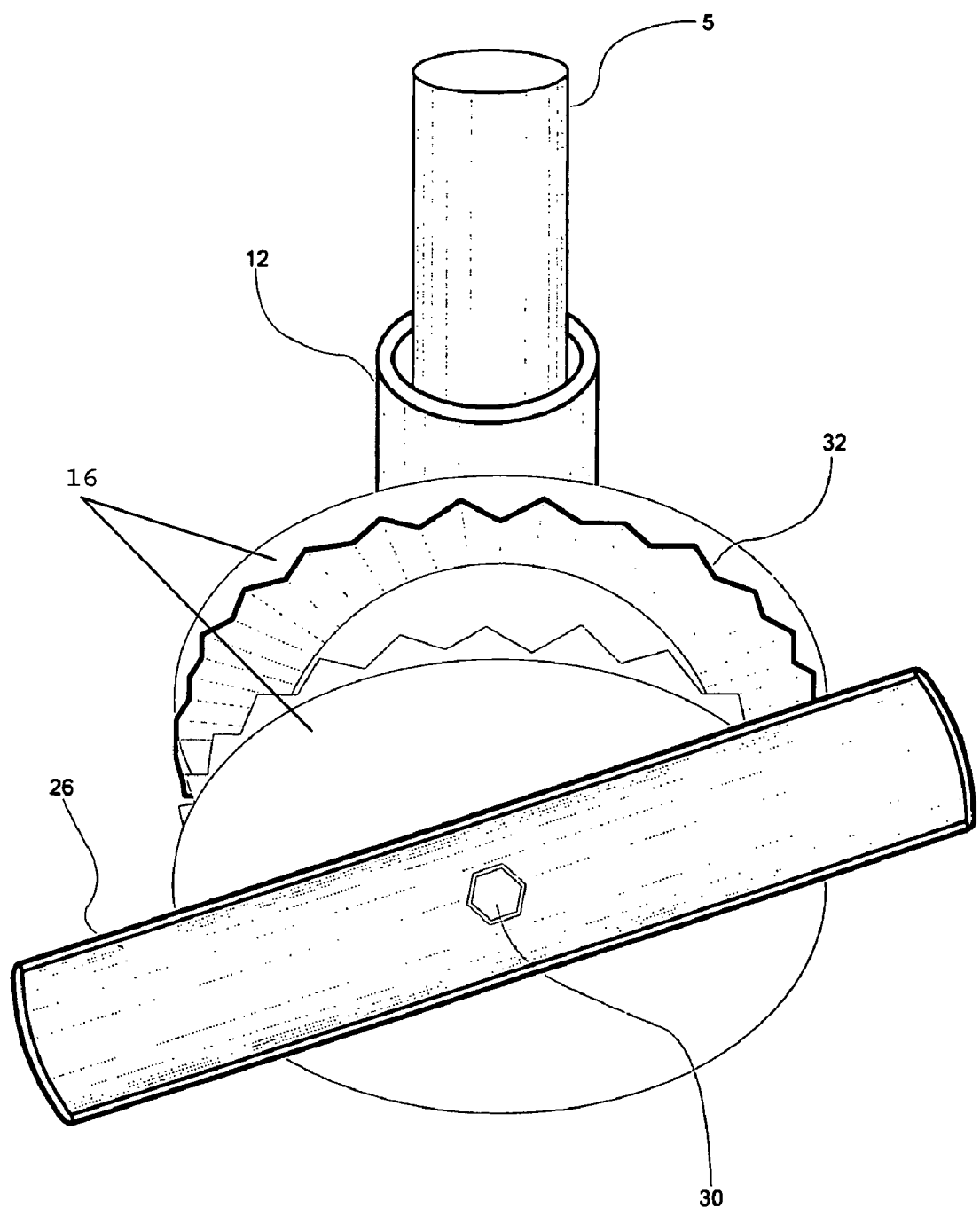
FIG. 17 illustrates a rear perspective view of a mounting means including an adjustable channel clamp.
Figure 18:
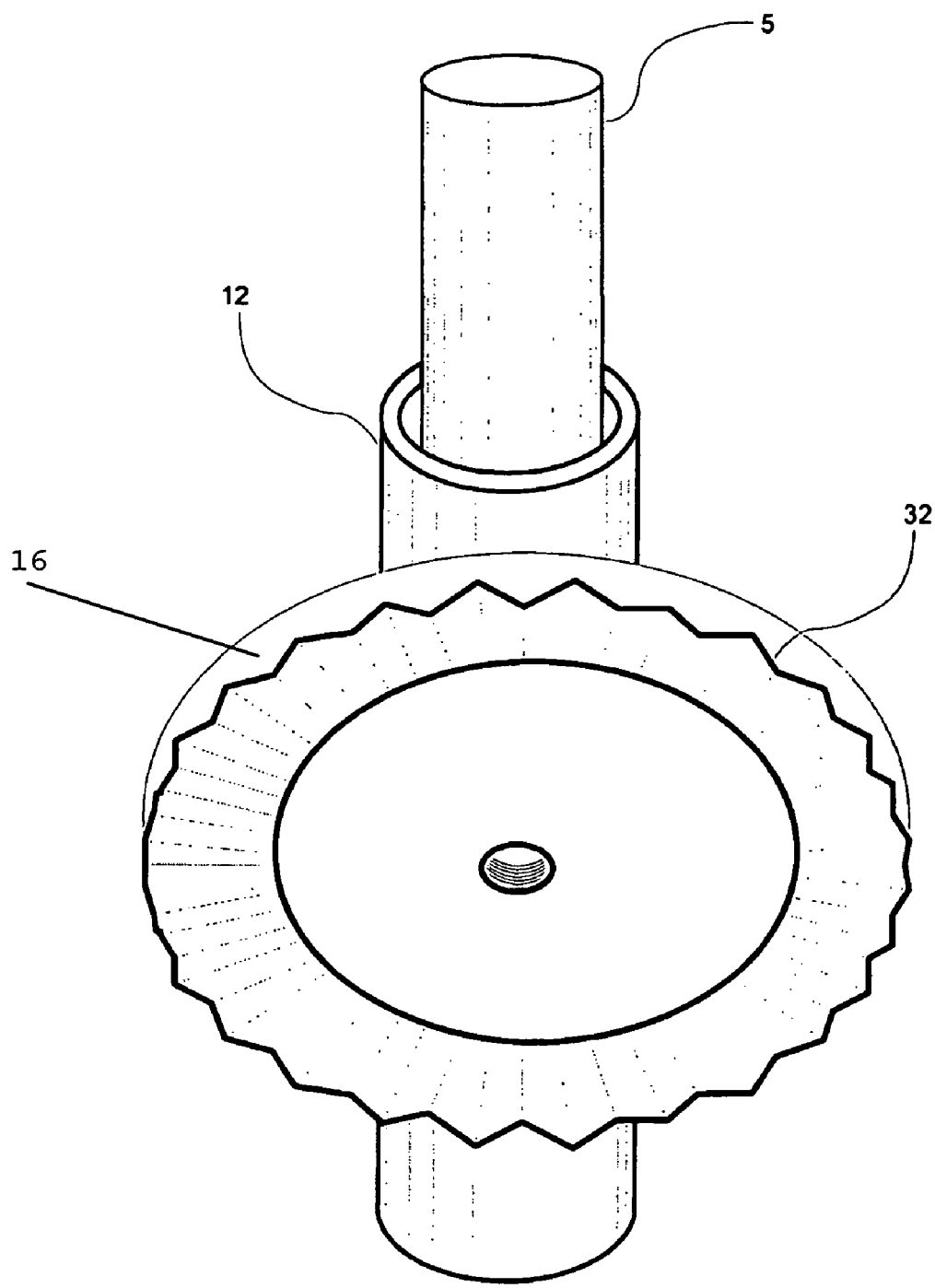
FIG. 18 illustrates a rear perspective view of a mounting means including detail of positional teach of a multi-positional mounting bracket.

Suitably, the multi-positional mount bracket 16 can be rotated to accommodate the possible different angles of attachment often encountered on RV ladders. As FIG. 16 illustrates, the multi-positional mount bracket 16 suitably comprises engaging inner working members having a plurality of gear-like teeth 32 arranged in a generally circular pattern. The multi-positional mount bracket 16 can be configured so that as the channel clamp 26 is rotated, the locking bolt 30 is also rotated which further rotates an inner working member joined to the locking bolt 30 within the multi-positional mount bracket 16. The teeth 32 of the inner working member allow the multi-positional mount bracket 16 to be rotated and fixed in a desired position, which further allows for the adjustment or rotation of the channel clamp 26 as illustrated in FIG. 17. Thus, in one embodiment, the twist member 10 and the socket member 12 may be secured to rungs of a RV ladder whereby the central axis of the rungs are perpendicular to the central axis of the pole 5 to be secured by the assembly. In another embodiment, the twist member 10 and the socket member 12 may be secured to rungs of a RV ladder whereby the central axis of the rungs are not perpendicular to the central axis of the pole 5 to be secured by the assembly.

Discussion of the Method for Installing a Pole

Figure 9:
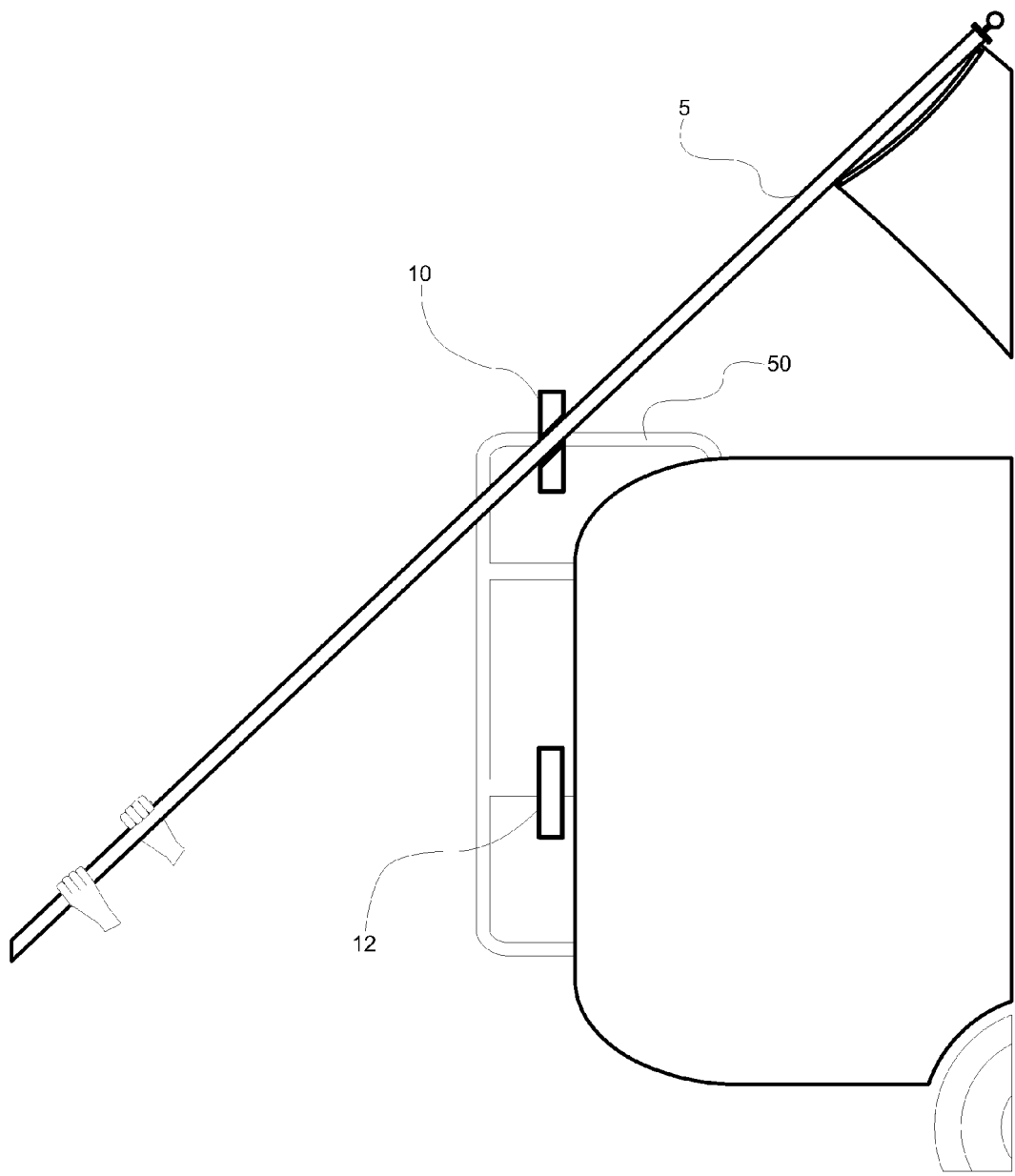
FIG. 9 illustrates a first step for inserting a flagpole into a vertically aligned twist member/socket member assembly, including the flagpole being inserted into the twist member at a 35° angle.
Figure 10:
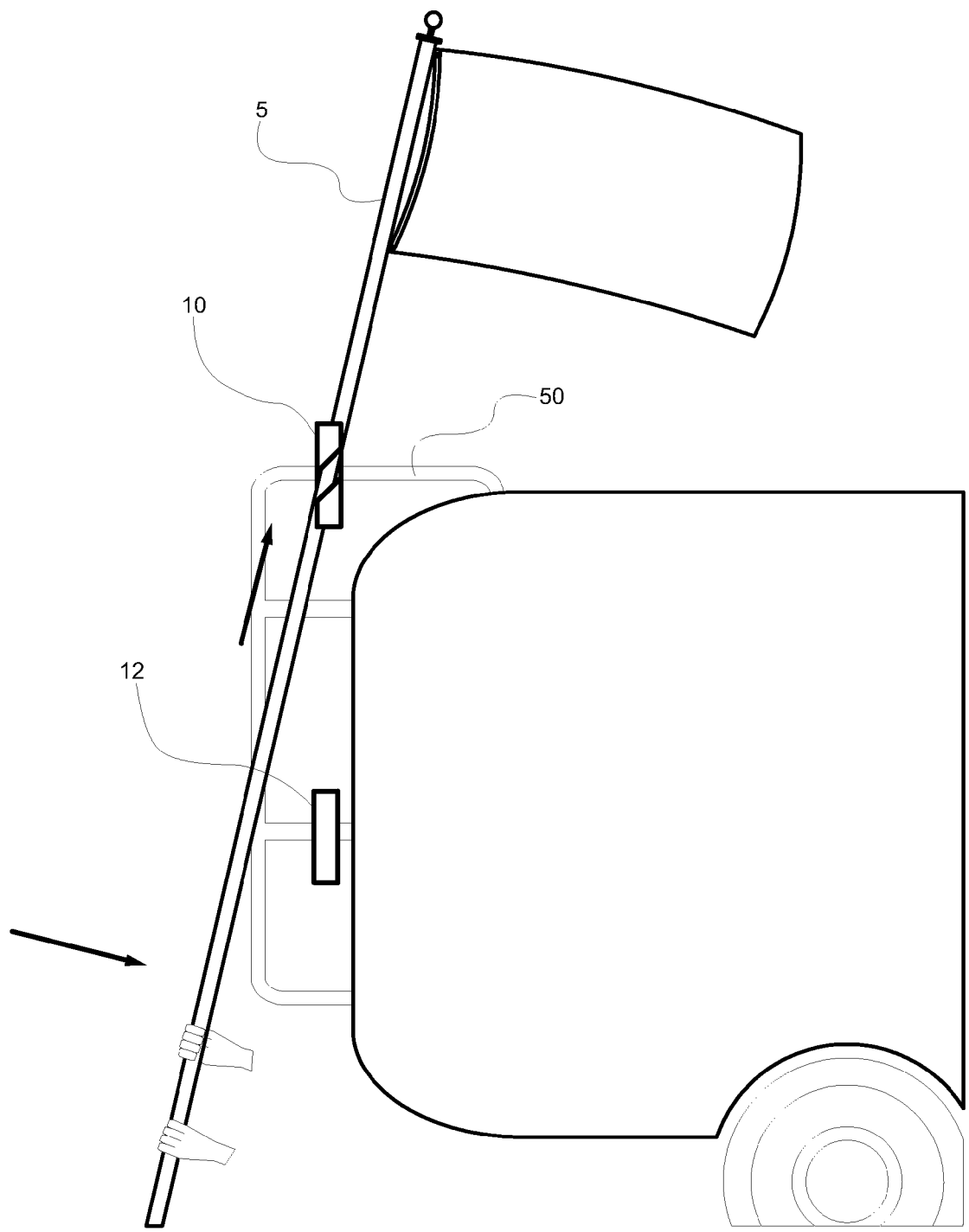
FIG. 10 illustrates a second step for inserting a flagpole into a vertically aligned twist member/socket member assembly, including directing the flagpole longitudinally through the twist member while also directing a lower end of the flagpole toward the socket member.
Figure 11:
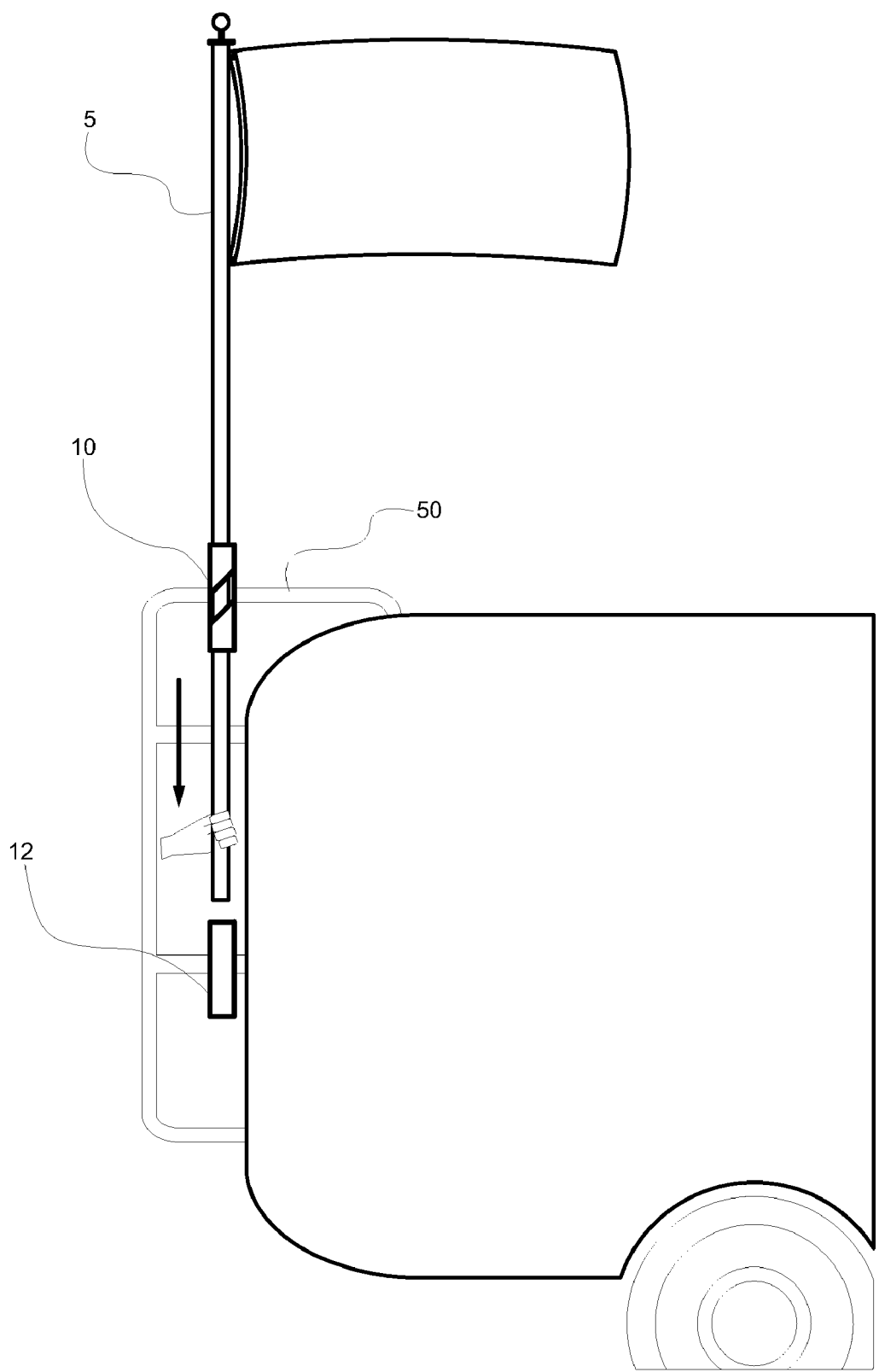
FIG. 11 illustrates a third step for inserting a flagpole into a vertically aligned twist member/socket member assembly, including directing the flagpole vertically toward the socket member.

The application is further directed to a method employing the above assembly for installing, securing, and removing a pole, such as a flagpole. Generally, once the twist member 10 and socket member 12 are secured to a support, the first step in the installation of a pole 5 involves directing a first end of the pole 5 through the side of the twisting member 10 at the open angled slot 18 at an angle of approximately 35°—as illustrated in FIG. 9. Once the pole 5 has been inserted through the open angled slot 18, the second end of the pole 5 can be directed toward the socket member 12. As the second end of the pole 5 moves toward the socket member 12 (as shown in FIG. 10) the section of the pole 5 within the twisting member 10 naturally follows the inside curvature created by the non-straight opening along the length of the twisting member through the open angled slot 18 until the central axis of the pole 5 is substantially aligned with the central axis of the twist member 10—as shown in FIG. 11. It is herein contemplated that in another embodiment the pole 5 can be directed toward socket member 12 while simultaneously directing the pole 5 through the twisting member 10—as illustrated by the direction of the arrows in FIG. 10.

Figure 12:
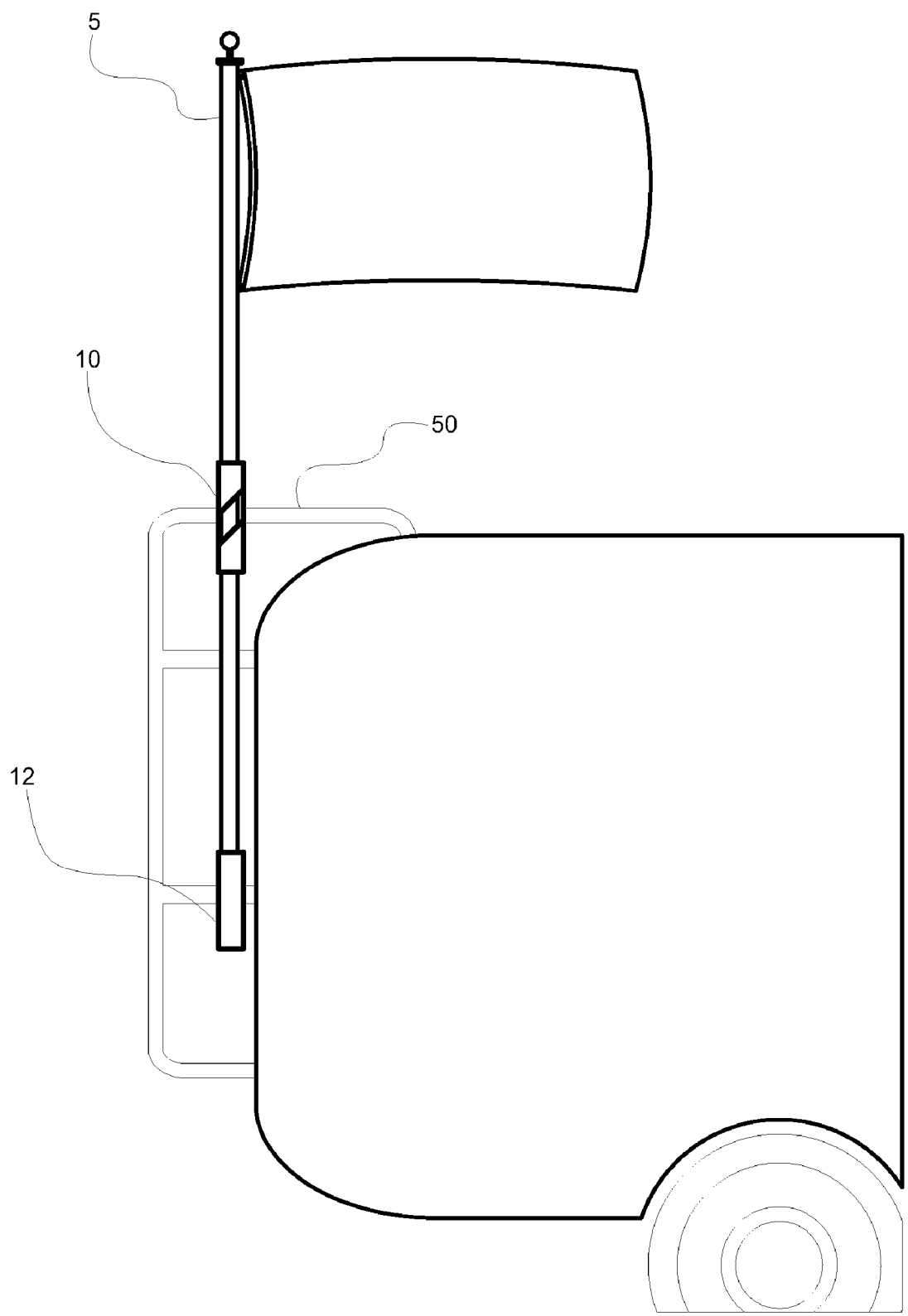
FIG. 12 illustrates a flagpole in an installed position within a vertically aligned twist member/socket member assembly.
Figure 13:
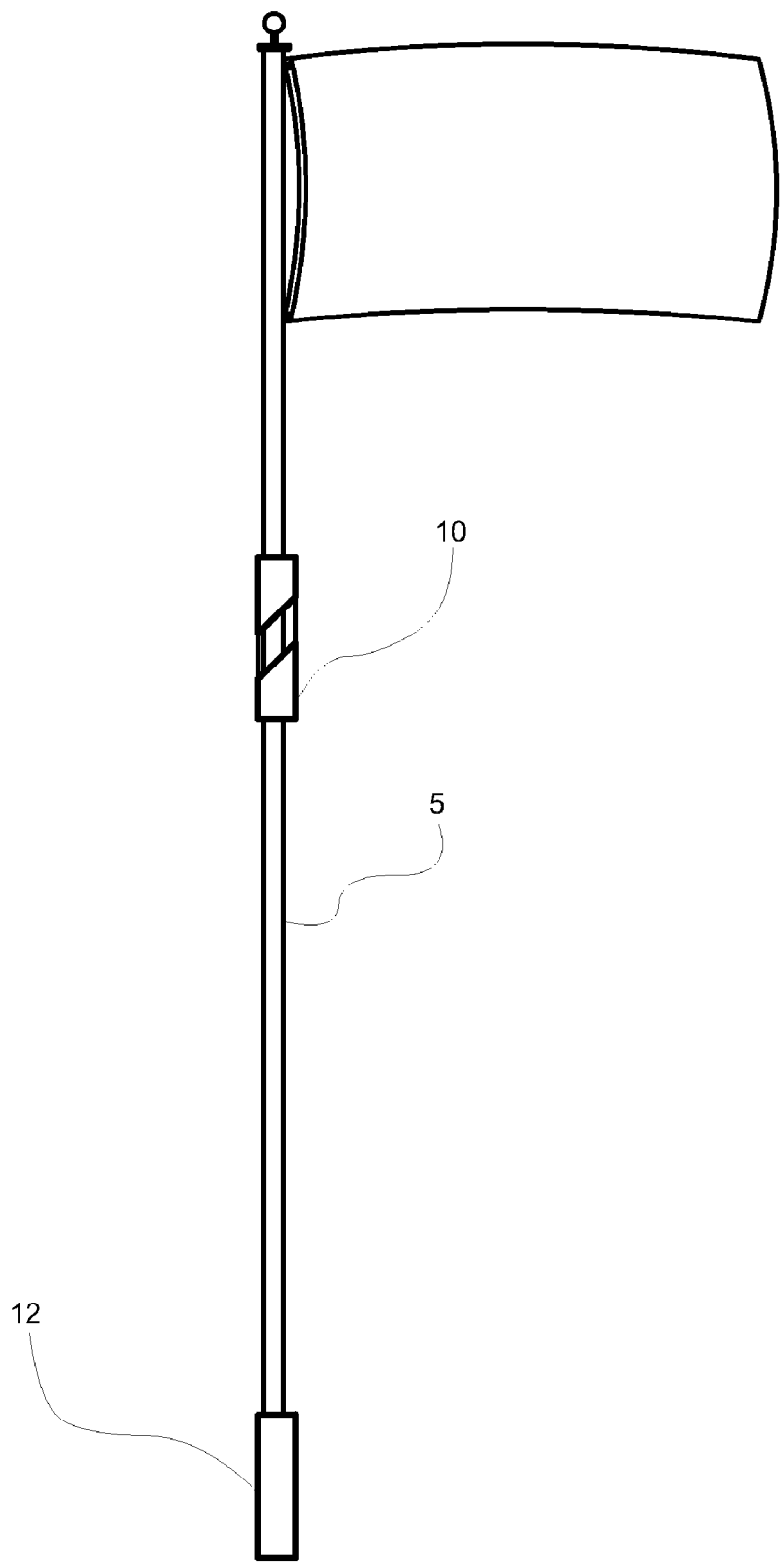
FIG. 13 illustrates another view of a flagpole installed within a twist member/socket member assembly.

Once aligned, the pole 5 can be directed toward the socket member 12 whereby the pole 5 is suitably held elevated by the closed end 22 of the socket member 12—as shown in FIGS. 12 and 13. To remove the pole 5 from the assembly, the above described steps can be reversed. It is herein contemplated that the above described method can be accomplished by one or more persons standing on the ground or floor next to the assembly.

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

I claim:

1. A method of installing a flag pole to a secured position, the method comprising the following steps:

provoding an assembly comprising a first support comprising a tubular member and a first mounting means for securing said first support to a first surface, said first mounting means featuring a multi-positional rotating mount bracket for rotating said tubular member; and a second support comprising a socket member and a second mounting means for securing said second support to a second surface, said tubular member comprising an open angled slot;

said socket member comprising a tube having a first open end and a second closed end said second closed end operationally configured to hold the flag pole when said pole is inserted in said socket member, said socket member further comprising an inner diameter greater than the outer diameter of the pole to be inserted into the socket member;

rotating said tubular member via said multi-positional rotating mount bracket to align said tubular member with said socket member;

directing a first end of the pole through the open angled slot at an oblique angle in relation to the central axis of the tubular member of said first support;

directing a second end of the pole toward the second support until the central axis of the pole is substantially aligned with the central axis of the tubular member of the first support;

finally, directing the pole toward the second support whereby the pole is held by the socket member.

2. The method of claim 1 wherein the assembly is attached to an RV ladder.

3. The method of claim 1 wherein the pole can be directed toward the second support while simultaneously directing the pole through the tubular member of said first support.

\* \* \* \* \*